(12) United States Patent
Sawada et al.

(10) Patent No.: US 8,238,733 B2
(45) Date of Patent: Aug. 7, 2012

(54) DEVICE HAVING HEATING/HEAT-RETAINING TUBE

(75) Inventors: Kazunori Sawada, Mie (JP); Haruki Shimada, Mie (JP); Yuji Nakabayashi, Mie (JP); Satoru Hosotani, Mie (JP); Nobuyuki Asari, Mie (JP)

(73) Assignee: Nitta Corporation, Osaka (JP)

( * ) Notice: Subject to any disclaimer, the term of this patent is extended or adjusted under 35 U.S.C. 154(b) by 996 days.

(21) Appl. No.: 12/182,392

(22) Filed: Jul. 30, 2008

(65) Prior Publication Data

US 2009/0034949 A1    Feb. 5, 2009

(30) Foreign Application Priority Data

Jul. 30, 2007    (JP) ................................. 2007-197707

(51) Int. Cl.
*F24H 1/10* (2006.01)
*E03B 7/10* (2006.01)
(52) U.S. Cl. .......................................... 392/488; 138/33
(58) Field of Classification Search ........... 392/465–496; 138/32, 33, 89–95
See application file for complete search history.

(56) References Cited

U.S. PATENT DOCUMENTS

| | | | |
|---|---|---|---|
| 1,985,280 A * | 12/1934 | Carleton | 392/478 |
| 3,270,182 A * | 8/1966 | Hynes | 392/492 |
| 3,378,282 A * | 4/1968 | Demler, Sr. | 285/148.13 |
| 3,551,643 A * | 12/1970 | Plaisted et al. | 392/488 |
| 3,624,594 A * | 11/1971 | Trimble et al. | 439/523 |
| 3,898,428 A | 8/1975 | Dye | |
| 3,980,526 A * | 9/1976 | Kirschmann | 202/83 |
| 4,192,988 A * | 3/1980 | Pederson et al. | 219/201 |
| 4,567,350 A | 1/1986 | Todd, Jr. | |
| 5,129,034 A | 7/1992 | Sydenstricker | |
| 5,216,743 A | 6/1993 | Seitz | |
| 5,408,578 A | 4/1995 | Bolivar | |
| 5,872,890 A | 2/1999 | LaCombe | |
| 5,892,887 A | 4/1999 | Thomas et al. | |
| 6,142,216 A * | 11/2000 | Lannes | 165/70 |
| 6,456,785 B1 * | 9/2002 | Evans | 392/488 |
| 7,190,894 B2 | 3/2007 | Chamberlain, Jr. | |
| 7,496,285 B2 | 2/2009 | Molavi | |
| 2004/0131346 A1 | 7/2004 | Chamberlain | |

FOREIGN PATENT DOCUMENTS

| | | |
|---|---|---|
| DE | 29715336 | 11/1997 |
| DE | 10003042 | 7/2001 |
| EP | 1070642 | 1/2001 |
| EP | 1653163 | 5/2006 |
| JP | 2005-351333 A | 12/2005 |

* cited by examiner

*Primary Examiner* — Daniel L Robinson
(74) *Attorney, Agent, or Firm* — Hahn & Voight PLLC; Roger C. Hahn

(57) ABSTRACT

A device having a tube for heating or heat retaining of fluid includes a first path in which a connection section of a cord heater led out of the tube and a lead wire connected to a power supply is provided, a second path provided between the tube and the first path, and a drainage path for removing leaked fluid of the second path. In this device, the connection section is sandwiched by a pair of first sealing members to retain a sealed state and the cord heater passes through the second path in a sealed state by a second sealing member. This device can effectively prevent gas or liquid from leaking into the space where the connection section of a lead wire and a cord heater is provided.

8 Claims, 6 Drawing Sheets

DEVICE HAVING HEATING/HEAT-RETAINING TUBE

BACKGROUND OF INVENTION

1. Field of the Invention

The present invention relates to a device having a tube for heating or heat-retaining of fluid such as gas and liquid by a cord heater inserted into the tube (hereinafter referred to as a heating/heat-retaining tube) through which the fluid is transported.

2. Description of the Related Art

This type of devices having a heating/heat-retaining tube include those already developed and filed for patent application by Japanese Patent Application Laid-Open (kokai) No. 2005-351333.

The above described heating/heat-retaining tube has various merits including, for example, low cost, small outer diameter, and suitability to complex piping layouts.

Meanwhile, in the device having the heating/heat-retaining tube, as shown in FIG. 5, one end of a lead wire LW is connected to the power supply P and the other end is connected to the cord heater CH which is led out of a tube joint. The connection area of the lead wire LW and the cord heart CH has the following configuration. Specifically, as shown in FIG. 6, in this configuration, two cap bodies 90 and 91 made of a resin material such as nylon or a fluorine resin are mutually screwed (with a female screw 92 and a male screw 93) so as to form a space section 94, a connecting section t of the lead wire LW and the cord heater CH is housed in the space section 94, and fluid is prevented from penetrating into the space section 94 by two O-rings 95 and 96 made of silicon. For attachment to a tube section 100, an O-ring 97 is provided on the inner wall of the tube section 100 to ensure airtightness mutually between the inner circumferential wall of the tube section 100 and the outer circumferential wall of the cap body 91.

However, in the above described connecting section t, the lead wire LW and the cord heater CH are bonded to each other merely by soldering the lead wire LW and the cord heater CH after removing the resin cover therefrom. Therefore, if the O-ring 96 on the cord heater CH side is, for example, deteriorated, gas or liquid may penetrate into the space section 94 and then into the cord heater CH or the lead wire LW. This causes an electrically dangerous situation and possibly damaging the entire system.

Therefore, a device is developed having a heating/heat-retaining tube which prevents gas or liquid from penetrating into the space 94 having the connecting section t of the lead wire LW and the cord heater CH.

SUMMARY OF THE INVENTION

Therefore, it is an object of the present invention to provide a device having a heating/heat-retaining tube which prevents gas or liquid from penetrating into the space where the connecting part of a lead wire and a cord heater is provided.

In order to achieve the above mentioned object, the present device having a heating/heat-retaining tube includes a first path in which a connection section of a cord heater led out of the tube and a lead wire connected to a power supply is provided, a second path provided between the tube and the first path, and a drainage path for removing leaked fluid of the second path. In this device, the connection section is sandwiched by a pair of first sealing members to retain a sealed state of the connection section and the cord heater passes through the second path in a sealed state by a second sealing member.

Moreover, the device may have a plurality of the first paths and the second paths.

Still further, the first and second sealing members of the above device may be formed in a tubular shape, and a plurality of circular projections may be provided on outer circumferential surfaces of the first and second sealing members respectively.

DESCRIPTION OF THE PREFERRED EMBODIMENTS

Hereinafter, embodiments will be described in detail for implementing a device having a heating/heat-retaining tube of the present invention.

(First Embodiment)

Figure 1:
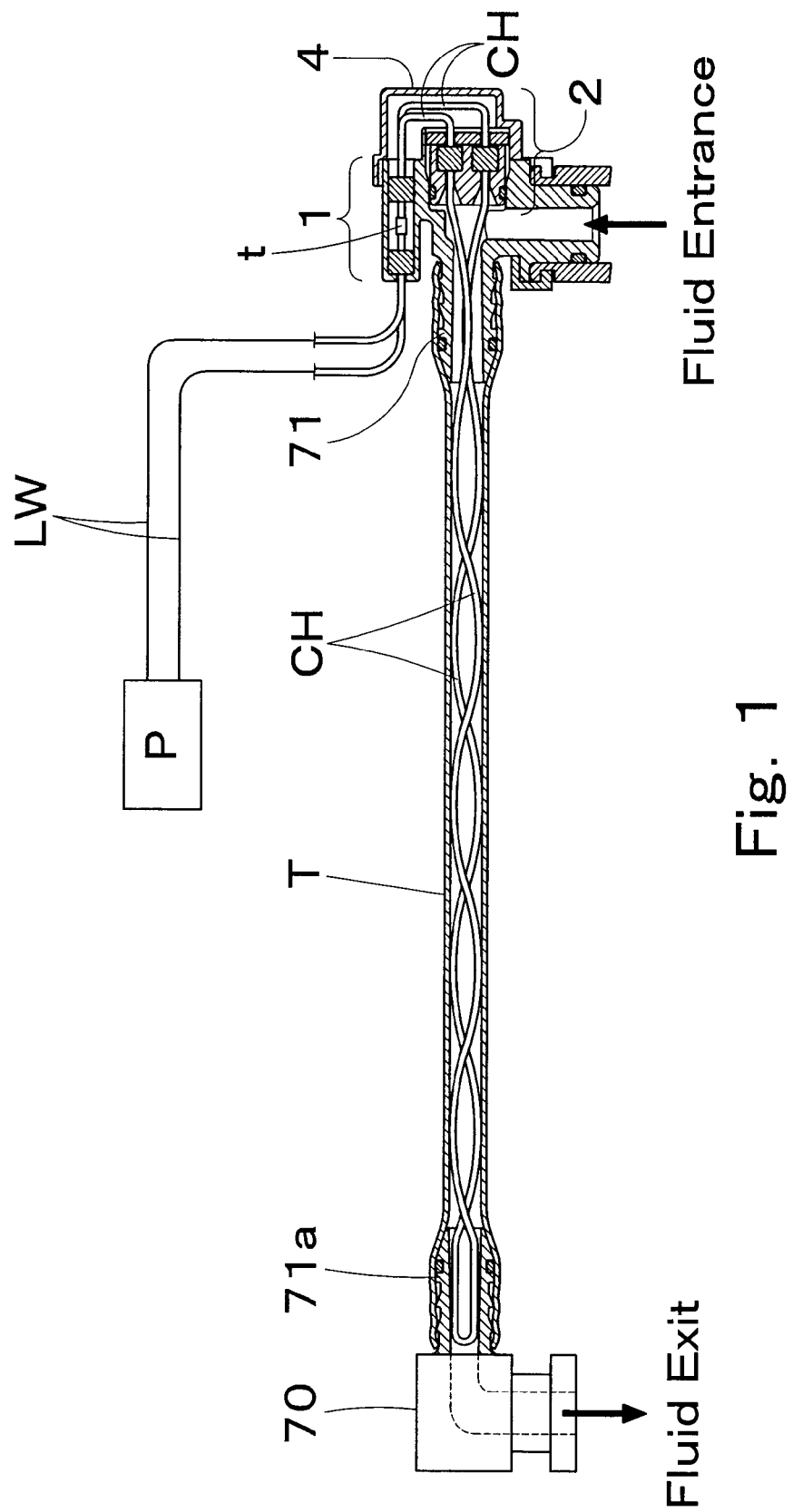
FIG. 1 is a cross sectional view of a device having a heating/heat-retaining tube according to a first embodiment of the present invention.
Figure 2:
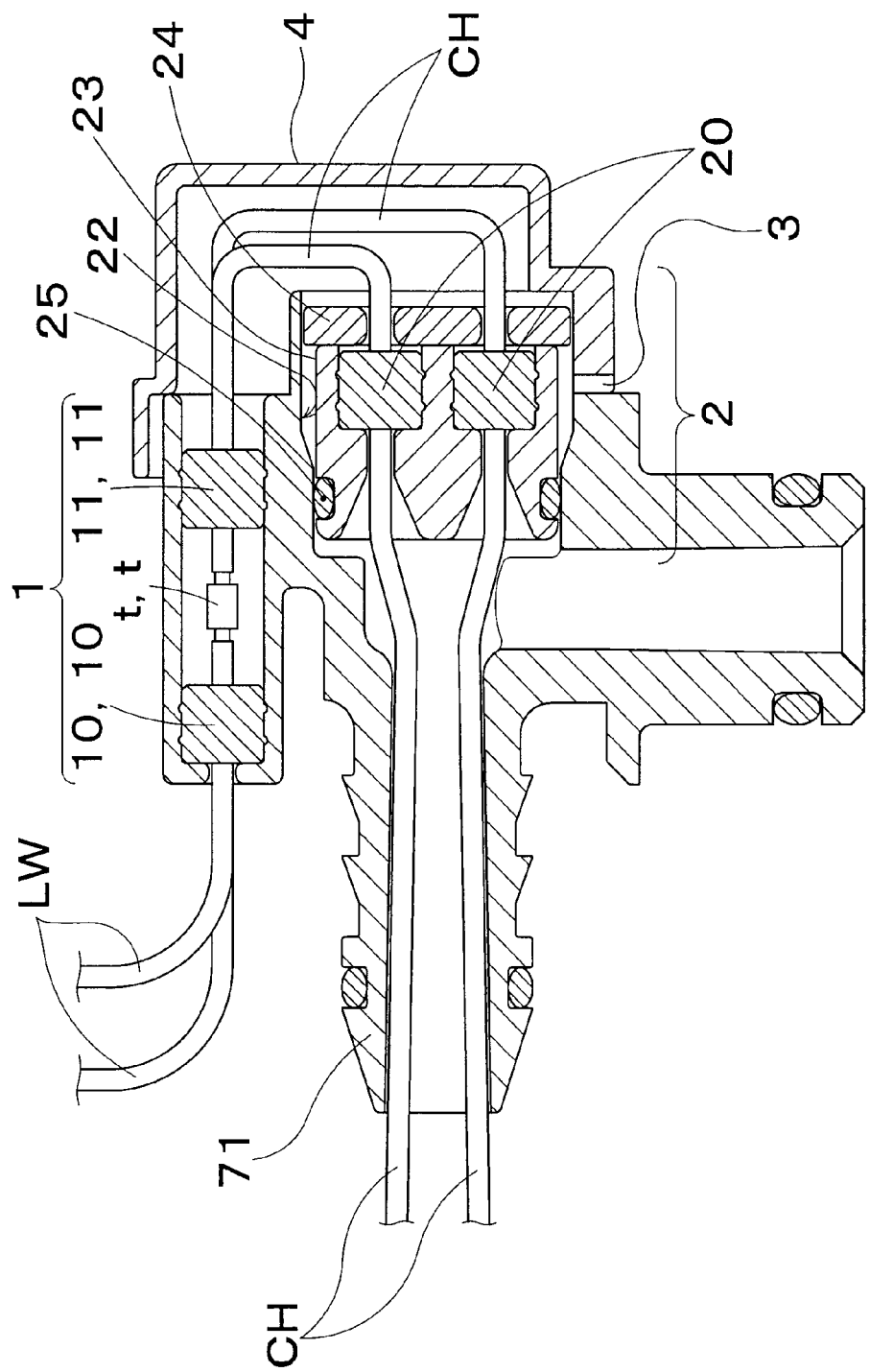
FIG. 2 is a cross sectional view of a connecting structure between lead wires and cord heaters in the device of the FIG. 1.
Figure 3:
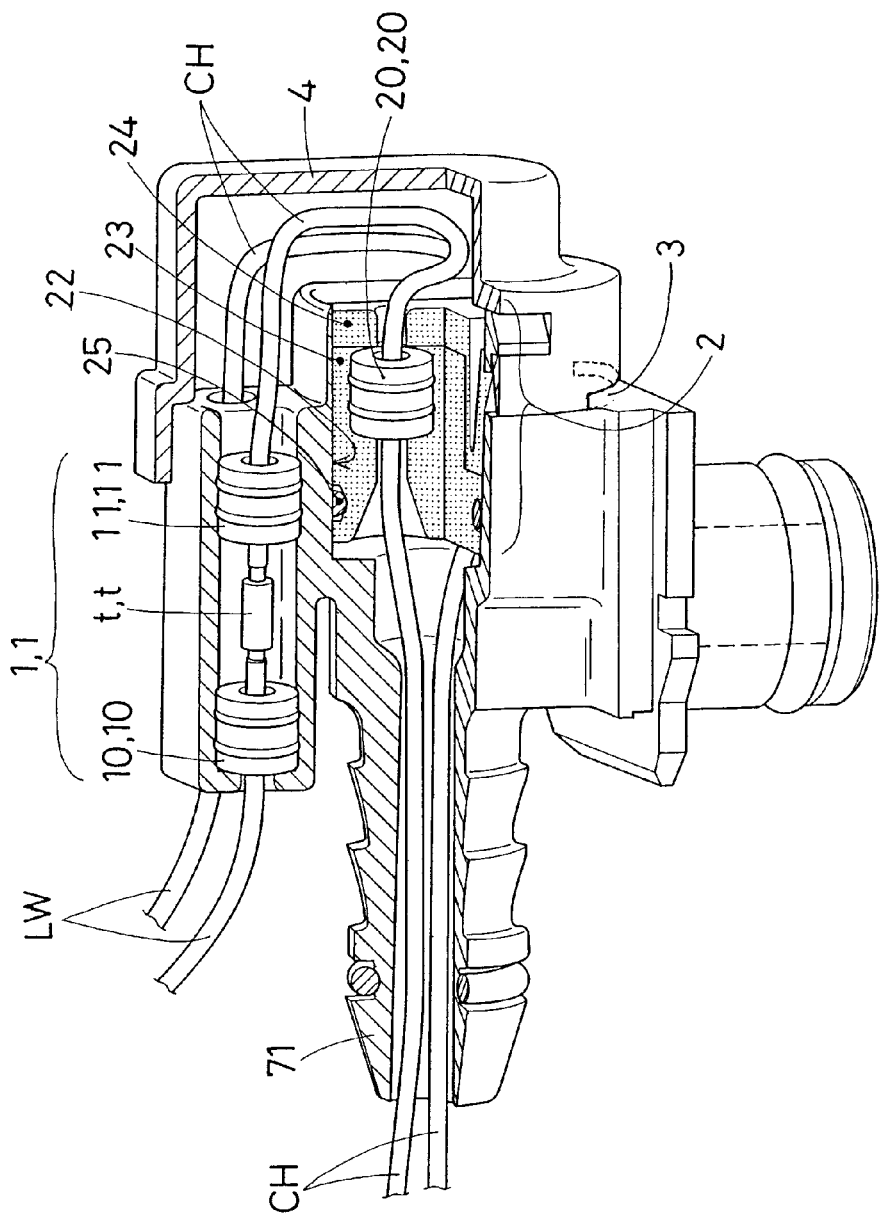
FIG. 3 is a cross sectional perspective view of the connecting structure between the lead wires and the cord heaters of the FIG. 2.

FIG. 1 is a cross sectional view of a device having a heating/heat-retaining tube according to this embodiment of the present invention, FIG. 2 is a cross sectional view of a connecting structure between lead wires LW and cord heaters CH in this device, and FIG. 3 is a cross sectional perspective view of the connecting structure between the lead wires LW and the cord heaters CH.

As shown in FIG. 1, the device having the heating/heat-retaining tube directly heats fluid or retains the heat of fluid flowing into the tube T by the cord heater CH inserted into the tube T. In this device, as shown in FIG. 1, one end of the tube T is externally press-fitted to a bamboo shoot shaped joint section 71 at the fluid entrance side and the other end of the tube T is externally press-fitted to a bamboo shoot shaped joint section 71a of a tube joint 70 at the fluid exit side. The cord heater CH is inserted into the tube T through a hole of the joint section 71 at the fluid entrance side, extended to the joint section 71a at the fluid exit side, and folded back to return to the joint section 71. As shown in FIG. 1, both ends of the cord heater CH which is led out of the tube T are connected to a power supply P via the lead wires LW.

In the device having the heating/heat-retaining tube, as shown in FIGS. 1 to 3, the connecting sections t of the cord heaters CH which are led out of the tube T and the lead wires LW which are connected to the power supply P are held in a sealed state in the manner that the connecting sections t are respectively sandwiched by a pair of first sealing members 10 and 11 in wire paths 1. Further, intermediate wire paths 2 are provided between the wire paths 1 and the tube T, and the both ends of the cord heater CH are respectively inserted into each of the intermediate wire paths 2 in a sealed state by second sealing members 20. Furthermore, a drainage path 3 is provided for removing the fluid such as liquid and gas which is leaked from the intermediate wire paths 2 to outside.

As shown in FIGS. 1 to 3, the wire paths 1 are integrally formed with the joint section 71 and placed higher than the joint section 71, and the two cord heaters CH extending from the tube T side and the two lead wires LW are connected to each other in the wire paths 1, respectively. In this embodiment, each of the wire paths 1 is formed in a circular form, with the connecting section t held in a sealed state internally and externally by the cylindrical sealing members 10 and 11 each of which having two circular projections on the inner/outer circumferential surfaces thereof. Since the first sealing members 10 and 11 have two circular projections, even if the sealing property of one of the circular projections, especially the one closer to the liquid, is deteriorated, the fluid-tightness of the connecting section t can be maintained by the other circular projection.

As shown in FIGS. 1 to 3, the above described intermediate wire paths 2 includes an opening section 22 located rear of the joint section 71, a block body 23 and a plug plate 24 respectively inserted into the opening section 22. The block body 23 and the plug plate 24 also have holes respectively through which the cord heater CH is inserted. The plug plate 24 has a groove having the same size as the block body 23 so that the plug plate 24 can be plugged into the block body 23. Because of the plug plate 24, the block body 23 does not move toward the right side of FIG. 2 even when liquid pressure is applied from the tube T side. On the outer surface of the block body 23, an O-ring 25 is provided so that the block body 23 is housed into the opening section 22 in a sealed state. As shown in FIGS. 2 and 3, the second sealing members 20 respectively have two circular projections similar to that of the above described sealing members 10 and 11. Since the second sealing member 20 has two circular projections, even when the sealing property of one of the circular projections, especially the one closer to the liquid, is deteriorated, the sealing property of the second sealing member 20 can be maintained by the other circular projection.

In this embodiment, a cover 4 is provided between the wire path 1 and the intermediate wire path 2 to cover the cord heater CH passing through therebetween as shown in FIG. 3, and the drainage path 3 is provided to the cover 4.

During use of this device, liquid pressure is applied to the second sealing members 20 from left to right of FIG. 2.

If the above described second sealing members 20 gradually deteriorate due to heat or other influences as time goes by, there is a possibility that liquid leaks out of the intermediate wire paths 2 into the cover 4 even when the second sealing members 20 are at predetermined positions. However, in this device, the leaked liquid in the cover 4 can be discharged to the outside of the cover 4 through the drainage path 3, so that the liquid pressure does not apply to the first sealing members 10 and 11 at all. In addition, since the wire paths 1 are provided at the place higher than where the liquid flows, the first sealing members 11 are not brought into contact with any liquid.

Therefore, there is no possibility that any liquid penetrates into the connecting sections t of the cord heaters CH and the lead wires LW connected to the power supply P. In other words, in use of this device according to the first embodiment, an electrically dangerous situation and a possible damage to the entire system due to the leaked fluid can be reliably avoided.

(Second Embodiment)

Figure 4:
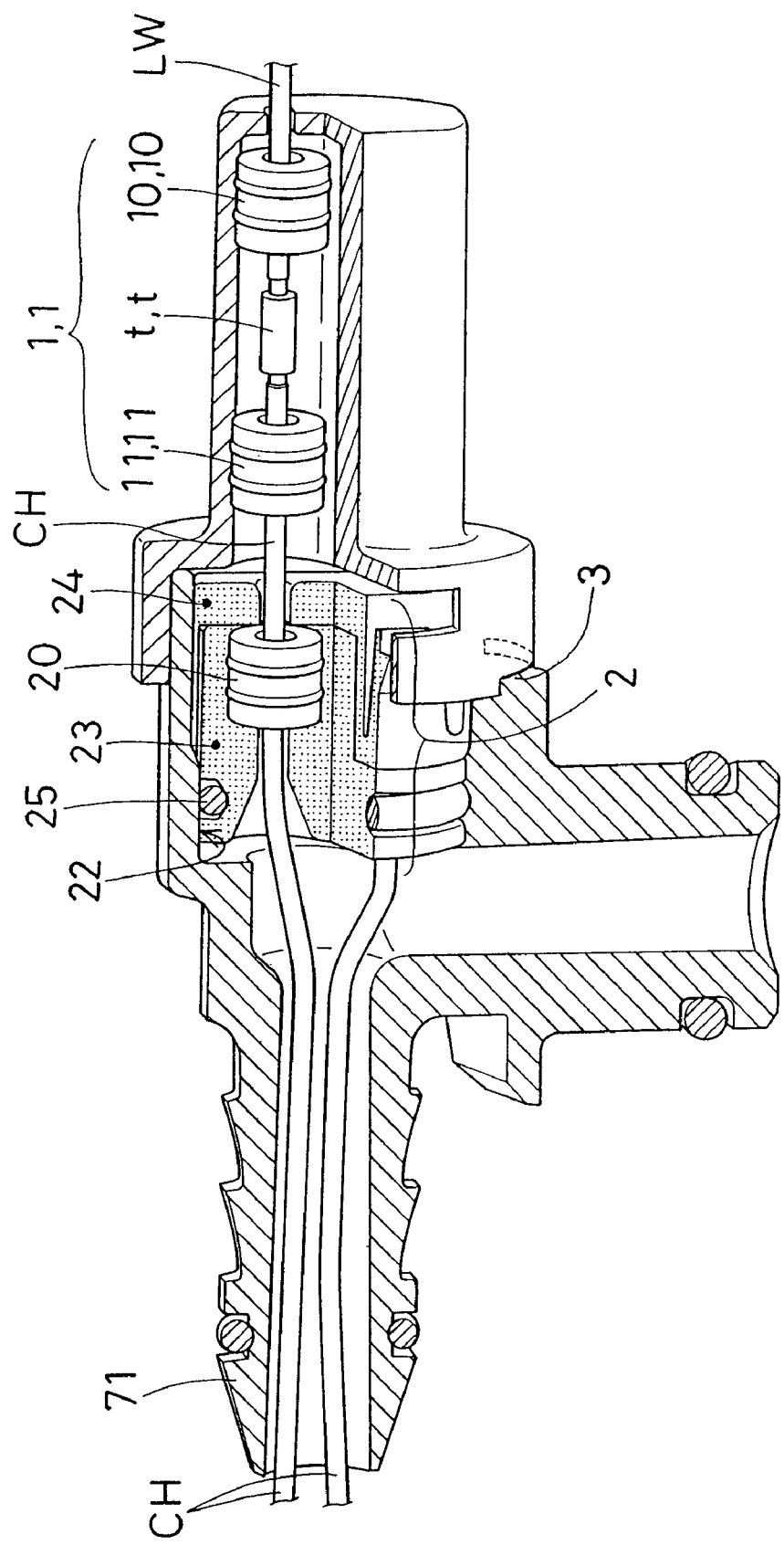
FIG. 4 is a cross sectional perspective view of the connecting structure between lead wires and cord heaters of a device having a heating/heat-retaining tube according to a second embodiment of the present invention.

FIG. 4 is a cross sectional perspective view of a connecting structure between lead wires LW and cord heaters CH of a device having a heating/heat-retaining tube according to a second embodiment of the present invention.

This device of the second embodiment differs from that of the first embodiment in that the wire paths 1 and the intermediate wire paths 2 are linearly disposed.

Also in this device, even if the second sealing members 20 are, for example, deteriorated, causing liquid to penetrate into the members 20, the liquid can be discharged to the outside from the drainage path 3, thereby reliably avoiding an electrically dangerous situation and damage to the entire system due to the leaked fluid in the same manner as the first embodiment.

(Other Embodiments)

The drainage path 3 according to the above described embodiments is merely one example, and any modification can be employed therefor as long as all the liquid, which leaks through the second sealing members 20 due to, for example, deterioration of the second sealing members 20, can be discharged to outside readily.

Figure 5:
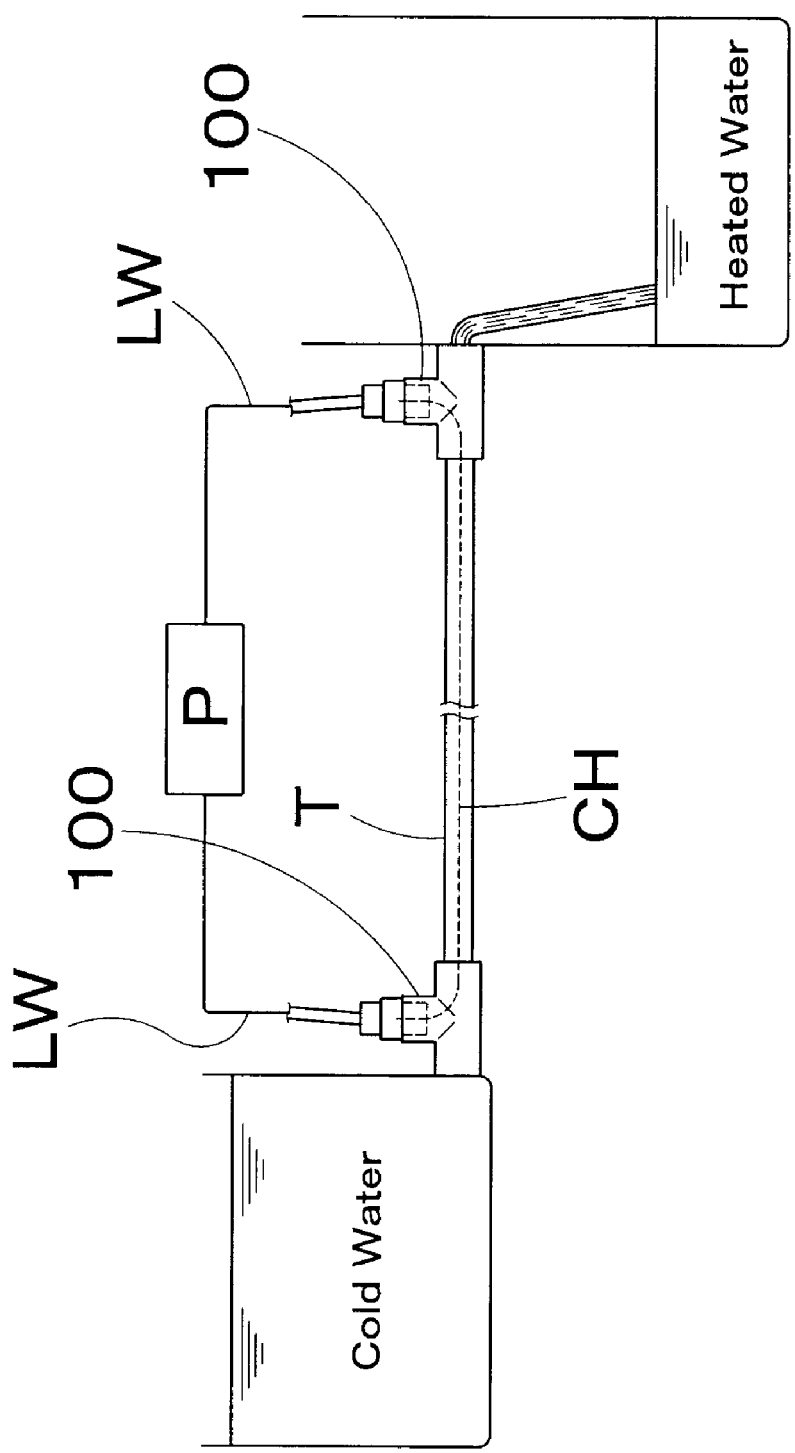
FIG. 5 is a schematic view of a system using a heating/heat-retaining tube according to a conventional art.
Figure 6:
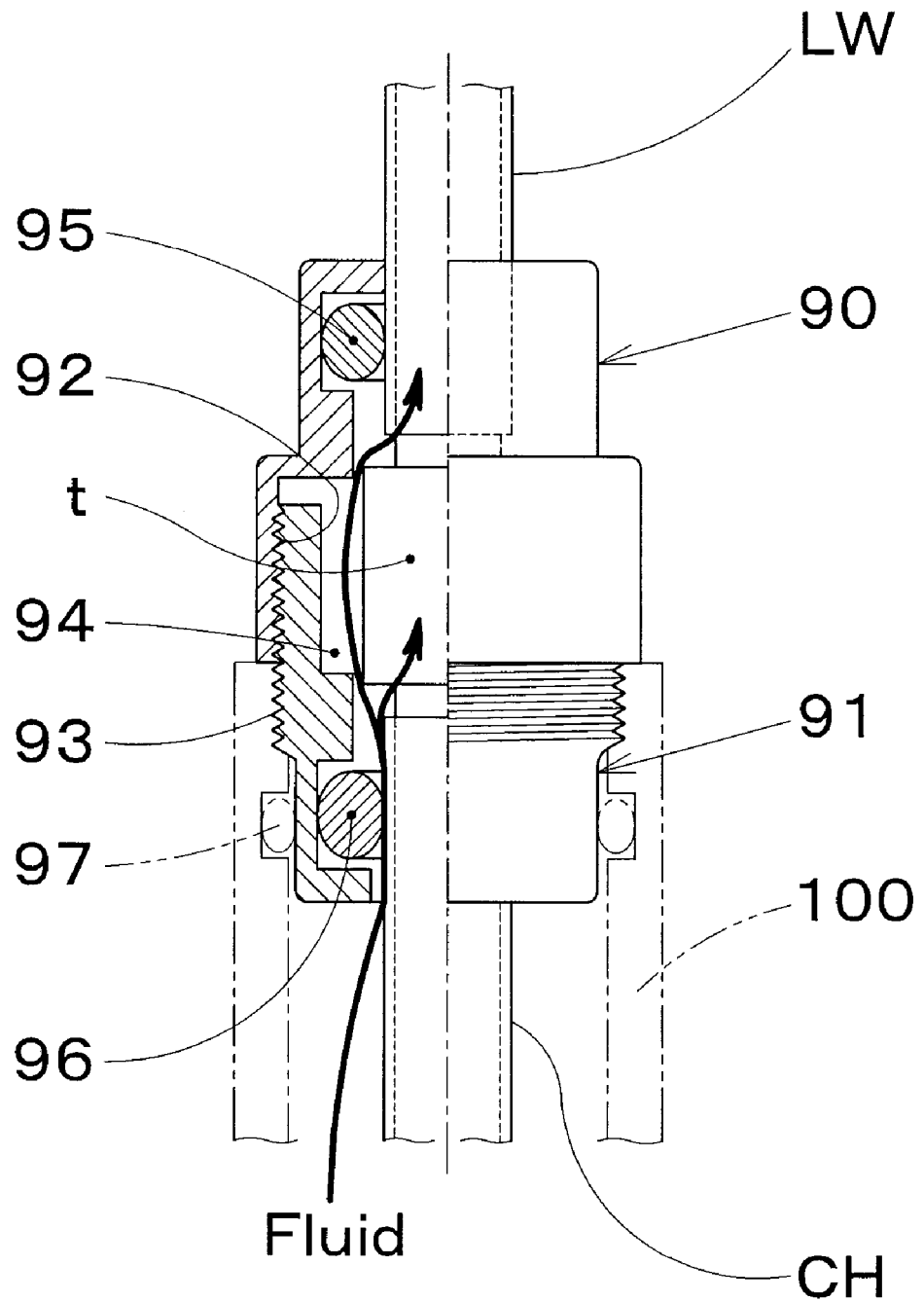
FIG. 6 is a cross sectional view of the connecting structure between the lead wire and the cord heater in the device according to the conventional art.

In the above described embodiments, the cord heater CH has a configuration in which it extends in one direction from the fluid entrance side to the fluid exit side and then folded back to return to the fluid entrance side, but the configuration is not limited thereto. The cord heater CH may be also configured so that it merely extends in one direction (see FIG. 5). In this case, there is no need to have more than one wire paths 1 and intermediate wire paths 2.

Since this device has the above described structure, it can prevent fluid such as gas and liquid from leaking into the space where the connecting section t of the lead wire LW and the cord heater CH is provided, thereby reliably avoiding an electrically dangerous situation and a possible damage to the entire system.

Those skilled in the art will appreciate that various adaptation and modifications of the just-described preferred embodiment can be configured without departing from the scope and sprit of the invention. Therefore, it is to be understood that, within the scope of the appended claims, the invention may be practiced other than as specifically described herein.

What is claimed is:

1. A device having a tube for heating or heat retaining of fluid comprising:
    an end of the tube fitted into a joint section;
    a first path integrally formed with the joint section, in which a connection section of a cord heater exiting the tube and a lead wire connected to a power supply is provided, wherein the connection section is sandwiched by a pair of first sealing members to retain a sealed state;
    a second path provided between the tube and the first path, wherein the cord heater passes through the second path in a sealed state by a second sealing member; and
    a drainage path for removing leaked fluid of the second path.

2. The device according to claim 1, further comprising: an additional first path having a structure of the first path and an additional second path having a structure of the second path.

3. The device according to claim 1, wherein
    the first and second sealing members are formed in a tubular shape, and a plurality of circular projections are provided on outer circumferential surfaces of the first and second sealing members respectively.

4. The device according to claim 1, wherein the first path is placed higher than the end of the tube fitted into the joint section.

5. A device having a tube for heating or heat retaining of fluid comprising:
 a first path in which a connection section of a cord heater exiting the tube and a lead wire connected to a power supply is provided, wherein the connection section is sandwiched by a pair of first sealing members to retain a sealed state;
 a second path provided between the tube and the first path, wherein the cord heater passes through the second path in a sealed state by a second sealing member; and
 a drainage path for removing leaked fluid of the second path, wherein the first and second sealing members are formed in a tubular shape.

6. The device according to claim 5, further comprising:
 an additional first path having a structure of the first path and an additional second path having a structure of the second path.

7. A device having a tube for heating or heat retaining of fluid comprising:
 a first path in which a connection section of a cord heater exiting the tube and a lead wire connected to a power supply is provided, wherein the connection section is sandwiched by a pair of first sealing members to retain a sealed state;
 a second path provided between the tube and the first path, wherein the cord heater passes through the second path in a sealed state by a second sealing member; and
 a drainage path for removing leaked fluid of the second path, wherein the first and second sealing members are formed in a tubular shape, and a plurality of circular projections are provided on outer circumferential surfaces of the first and second sealing members respectively.

8. The device according to claim 7, further comprising:
 an additional first path having a structure of the first path and an additional second path having a structure of the second path.

* * * * *